(12) United States Patent
Kuhl et al.

(10) Patent No.: US 11,387,723 B2
(45) Date of Patent: Jul. 12, 2022

(54) HOT DROP FASTENING OF COATED MACHINE COMPONENTS

(71) Applicant: Deere & Company, Moline, IL (US)

(72) Inventors: Marcus L. Kuhl, Cedar Falls, IA (US); Clayton P. Neumann, Cedar Falls, IA (US); Roger W. Burjes, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 340 days.

(21) Appl. No.: 16/670,475

(22) Filed: Oct. 31, 2019

(65) Prior Publication Data
US 2021/0135553 A1 May 6, 2021

(51) Int. Cl.
*H02K 15/12* (2006.01)
*H02K 15/14* (2006.01)
*H05B 6/12* (2006.01)
*H02K 5/08* (2006.01)

(52) U.S. Cl.
CPC ............ *H02K 15/125* (2013.01); *H02K 5/08* (2013.01); *H02K 15/14* (2013.01); *H05B 6/129* (2013.01);
(Continued)

(58) Field of Classification Search
CPC ........ H02K 15/14; H02K 15/125; H02K 5/00; H02K 5/08; H02K 1/276; H02K 15/12;
(Continued)

(56) References Cited

U.S. PATENT DOCUMENTS 10,637,321 B1 * 4/2020 Newcomb ............... H02K 5/02
10,916,989 B2 * 2/2021 Ishikawa ................ F25B 13/00
(Continued)

FOREIGN PATENT DOCUMENTS

CN 107947479 A * 4/2018
DE 102013205238 A1 9/2014
(Continued)

OTHER PUBLICATIONS

Kampker, Achim, "Elektromobil-produktion," Springer-Verlag Berlin Heldelbert 2014, DOI: 10.1007/978-3-642-42022-1_1.
(Continued)

*Primary Examiner* — Quyen P Leung
*Assistant Examiner* — Leda T Pham
(74) *Attorney, Agent, or Firm* — Tucker Ellis LLP (57) ABSTRACT

A method of hot drop fastening components and a product thereby made is described. Machine components are provided. A first machine component defines a passageway and carries a coating. The first machine component is caused to expand by delivering a predetermined amount of energy to the first machine component, wherein the predetermined amount of energy is based on a property of the coating. A second machine component is inserted into the passageway of the expanded first machine component. Thereafter, the first machine component is permitted to cool with the first machine component inserted in the passageway thereby fastening the first machine component with the second machine component by the first machine component contracting as it cools. Properties such as adhesion and/or rust prevention properties of a primer coating in a motor manufactured using a hot drop process are preserved during the hot drop process in the manufactured product.

20 Claims, 3 Drawing Sheets

(52) U.S. Cl.
CPC .... *Y10T 29/49009* (2015.01); *Y10T 29/49083* (2015.01); *Y10T 29/49087* (2015.01)

(58) Field of Classification Search
CPC ......... Y10T 29/49089; Y10T 49/49087; Y10T 49/49009
See application file for complete search history.

(56) References Cited

U.S. PATENT DOCUMENTS

2002/0073621 A1* 6/2002 Clark ..................... H02K 5/02
49/349
2019/0319509 A1 10/2019 Ishikawa

FOREIGN PATENT DOCUMENTS

DE        102016222815 A1    5/2018
WO    WO-2014158260 A1 * 10/2014 ............. B29C 70/70

OTHER PUBLICATIONS

German Search Report for corresponding German patent application No. DE102020211981A1, dated Jul. 21, 2021, 12 pages.
Kampker, Achim, "Elektromobil-produktion," Springer-Verlag Berlin Heldelbert 2014, DOI: 10.1007/978-3-642-42022-1_1, 292 pages, [English Translation].

* cited by examiner

HOT DROP FASTENING OF COATED MACHINE COMPONENTS

FIELD OF THE DISCLOSURE

The embodiments herein relate generally to methods of manufacture of machine components that use energy to heat a first machine component to cause it to expand so that the hot first machine component and a second machine component may be moved ("dropped") relative to each other for the first machine component to surround the second machine component so that the first machine component may grip onto the inner second machine component as it cools and shrinks, and to electric machines thereby formed. Although the embodiments will be described with reference to electrical machine components such as electric motors and the like and their methods of manufacture, it is to be appreciated that the claimed embodiments are also amenable to other applications and operating conditions, and can be equivalently extended to other devices, systems, and environments such as for example to industrial devices, systems, and environments and to other applications, or anywhere there is a need for a coupling components using heat to set up frictional engagement between the components.

BACKGROUND

Electric machines such as electric motors typically have a stator which is made of numerous thin laminations of steel that are stacked together to form a stator body. The stator defines passageways that are configured to receive windings that carry electric current. After the set of numerous thin laminations of steel are stacked together they may be glued, welded or otherwise connected to form the stator body, wherein the windings may be thereafter set into the passageways of the stator body to form a stator component. A housing is provided and the completed stator component is placed within the housing.

It is preferred that the housing both contain and locate the stator component within the housing. In addition, the connection between the stator component and the housing is preferably tight enough in order to be able to provide sufficient reactive forces to counter the torque forces generated by the completed electric machine. It has been found that an interference fit between the outer housing member and the inner stator component may provide sufficient grip between the components in order to counter the torque forces generated during operation of the completed electric machine. In an interference fit, the inside diameter of the housing is approximately the same or smaller that the outer diameter of the stator component wherein the engagement between the inside diameter of the housing and the outer diameter of the stator component holds the stator component in place within the housing.

One method of assembling these components is to provide a housing having an inner diameter, provide a stator component having an outer diameter wherein the inner diameter of the housing is slightly less than the outer diameter of the stator component, and to simply press the housing and stator components together. The frictional forces between the inside diameter of the housing and the outer diameter of the stator component hold the housing and stator components together.

A popular method to assemble these parts to reduce the chance of damaging the parts by the press-fit operation, however, is to heat the housing in an oven or by using an induction coil so that it expands allowing for easier insertion of the stator. This is commonly called "hot drop" process. However, this heating process can make providing coatings the housing such as paint or the like a challenge since the temperature needed to cause the housing to sufficiently expand may be too hot to maintain the integrity of the coating through the process. Painting the completed electrical machine afterwards is a solution for avoiding the consequences of heat relative to the coatings, but can be expensive, however, since extensive masking is typically required to protect certain features of the components such as threaded openings or the like.

Electric machines need protective coatings such as primer for several reasons. It serves as a rust preventative during storage and shipment or providing a preparatory coating for paint adhesion for example. Coating the individual machine components particularly raw castings before machining for example, with a protective layer such as with a primer is a cost-effective way to apply the primer. However, hot drop processes may reach temperatures above the capabilities of primers wherein the integrity of the primer is compromised by using the hot drop process.

An alternative to priming the raw castings of the components prior to assembly is painting the electric machine after assembling. This solution proves to be quite costly as extensive masking is required and is typically outside of the expertise of the assembling supplier. Using this approach typically requires that the completed machine be shipped off site to a different facility.

It is therefore desirable to provide a hot drop process that can be used to thermally expand a coated machine component, such as an electric motor housing carrying a coating such as primer, enough to allow assembly of a stator into the housing, while keeping the maximum temperature below a temperature that would cause one or more properties of the coating such as a primer to degrade to maintain integrity and other properties of the primer.

SUMMARY

The embodiments herein provide for new and improved hot drop process, and to electric machines thereby formed.

In accordance with an aspect, first and second machine components are provided. The first machine component defines a passageway and carries a coating. The first machine component is caused to expand by delivering a predetermined amount of energy to the first machine component, wherein the predetermined amount of energy is based on a property of the coating. The second machine component is inserted into the passageway of the expanded first machine component. Thereafter, the first machine component is permitted to cool with the first machine component inserted in the passageway thereby fastening the first machine component with the second machine component by the first machine component contracting as it cools.

In accordance with a further aspect, first and second machine components are provided. The first machine component defines a passageway and carries a coating. The first machine component is caused to expand by delivering a predetermined amount of energy to the first machine component, wherein the predetermined amount of energy is based on a combination of a property of the coating and a property of the first machine component. The second machine component is inserted into the passageway of the expanded first machine component. Thereafter, the first machine component is permitted to cool with the first machine component inserted in the passageway thereby fastening the first machine component with the second machine component by the first machine component contracting as it cools.

In accordance with yet a still further aspect, an electric motor is provided having an electric motor housing defining a passageway, a primer material on the electric motor housing, the primer material having one or more properties, and a stator component. The stator component and the electric motor housing are mutually hot drop fastened by a hot drop method including causing the electric motor housing to expand by delivering a predetermined amount of energy to the electric motor housing, wherein the predetermined amount of energy delivered to the electric motor housing is based on the one or more properties of the primer material, inserting the stator component into the passageway of the expanded electric motor housing, and permitting the electric motor housing to cool with the first stator inserted in the passageway thereby fastening the electric motor housing with the stator component by the electric motor housing contracting as it cools.

In accordance with yet a still further aspect, the stator component and the electric motor housing of the electric motor are mutually hot drop fastened by the hot drop method delivering the predetermined amount of energy to the electric motor housing by heating the electric motor housing to a temperature: greater than a first temperature needed to cause the passageway of the electric motor housing to expand to a size sufficient to receive the stator component in the passageway of the electric motor housing; and less than a second temperature that would cause the one or more properties of the primer to degrade.

Other embodiments, features and advantages of the example embodiments of new and improved hot drop processes, will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, example embodiments of the claimed invention are illustrated, which, together with a general description of the embodiments given above, and the detailed description given below, serve to exemplify the example embodiments of the claimed invention.

DETAILED DESCRIPTION

In the following description of the example embodiments reference is made to the accompanying Figures which form a part thereof, and in which is shown, by way of illustration, example embodiments illustrating various principles of the claimed invention and how it may be practiced. Other embodiments can be utilized to practice the claimed invention and structural and functional changes can be made thereto without departing from the spirit and scope of the descriptions herein.

Figure 1:
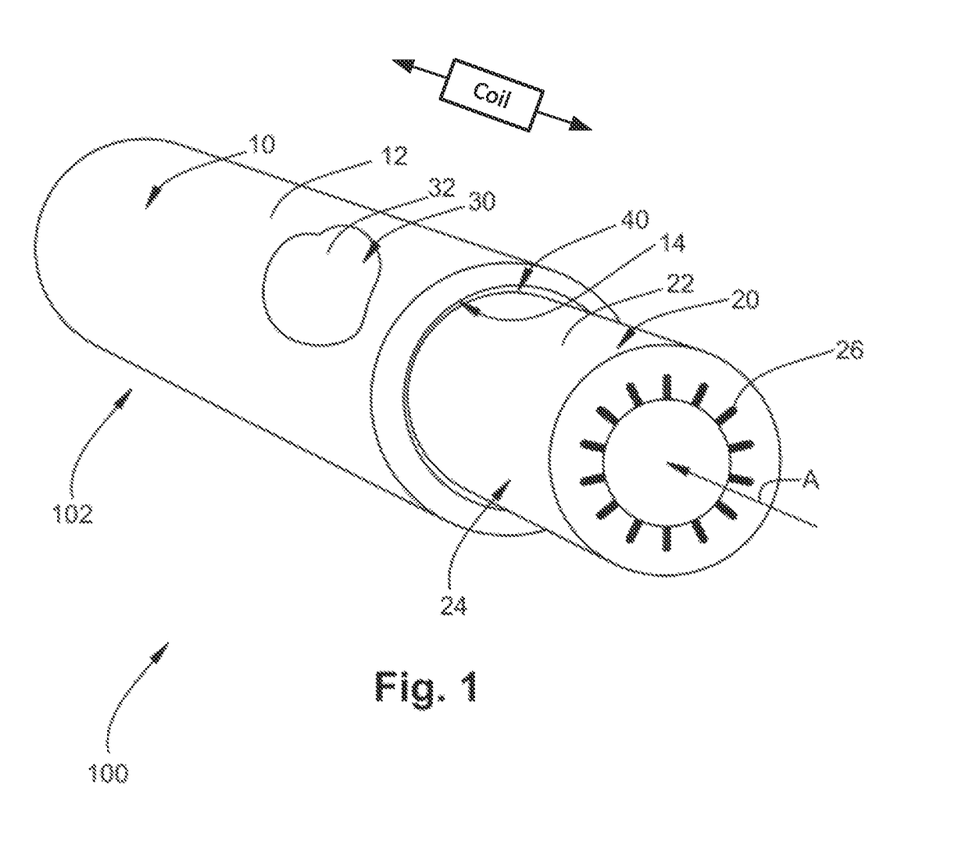
FIG. 1 is a schematic depiction of a collection of machine components 100 being hot drop fastened in accordance with an example embodiment.

Referring now to the drawings, wherein the showings are only for the purpose of illustrating the example embodiments of methods and apparatus for hot drop fastening of coated machine components, and not for purposes of limiting the same, FIG. 1 is a schematic depiction of a collection of machine components 100 being hot drop fastened in accordance with an example embodiment. With reference now to that Figure, the components 100 illustrated in accordance with the example embodiment form an electric motor 102 including a first machine component 10 in the form of an electric motor housing 12, and a second machine component 20 in the form of a stator component 22. As shown, the first machine component 10 in the form of the electric motor housing 12 has a substantially cylindrical conformation wherein the electric motor housing 12 defines an inner diameter 14.

Further as shown, the electric motor housing 12 carries a coating 30 such as for example a coating of a primer 32, for example. The coating may provide benefits such as an adhesion benefit for adhesion of paint to the motor 102 after assembly. The coating may further provide protection to the components such as for example rust prevention so that corrosion of the components may be minimized during assembly, warehousing, shipment, and the like. In the example embodiment, the primer is a black cathodic epoxy electrocoat, although it is to be understood that the subject embodiments are not limited to that particular primer or to that particular manufacturer or to any primers or coatings in general.

Further as shown in the Figure, the second machine component 20 in the form of a stator component 22 similarly also has a substantially cylindrical conformation wherein the stator 22 defines an outer diameter 24. In addition and as shown, the stator 22 includes a plurality of passageways 26 configured to receive windings for carrying current through the body of the stator 22 in accordance with known principles and practices. As mentioned above, electric machines such as the electric motor 102 of the example embodiment typically have a stator which is made of numerous thin laminations of steel that are stacked together to form a stator body. The stator defines passageways 26 that are configured to receive windings that carry electric current. After the set of numerous thin laminations of steel are stacked together they may be glued, welded or otherwise connected to form the stator body such as shown in in the Figure as a solid member for ease of description and discussion, wherein the windings (not shown) may be thereafter set into the passageways of the stator body to form a stator component.

It is to be appreciated that under normal manufacturing conditions and at or near to ambient temperatures, the inner diameter 14 of the housing member 12 is slightly smaller than the outer diameter 24 of the stator member 22 or, equivalently, the outer diameter 24 of the stator member 22 is slightly larger than the inner diameter 14 of the housing member 12. In that way, after the electric motor housing 12 and the stator component 22 may be mutually coupled in a process in a manner to be described below. The connection between the stator component and the housing is preferably tight enough to be able to provide sufficient reactive forces to counter the torque forces generated by the completed electric machine. In accordance with the example embodiment an interference fit is provided and/or otherwise established between the outer housing member 12 and the inner stator component 22 providing sufficient grip between the components in order to counter the torque forces generated during operation of the completed electric machine.

It is further to be appreciated that under conditions suitable for hot drop, the inner diameter 14 of the housing member 12 is slightly larger than the outer diameter 24 of the stator member 22. The housing member 12 is heated so that it expands. In that way, after the electric motor housing 12 is heated and expands, the stator component 22 may be inserted into the gap 40 between the housing member 12 and the stator 22.

In a particular example embodiment described herein, the housing member 12 may be made of gray cast iron, for example. In addition, the housing member 12 may have a nominal inner diameter (ID) of about 214 mm, and a nominal outer diameter (OD) of about 240 mm, for example. Further in addition, in a particular example embodiment described herein, the housing may have a nominal length of about 280 mm. Yet further in addition, in a particular example embodiment described herein, the stator member 22 may have any length as may be necessary or desired, but in the example embodiment it may have an active stator active length (the distance that engages with the housing) of about 210 mm for example.

Figure 2:
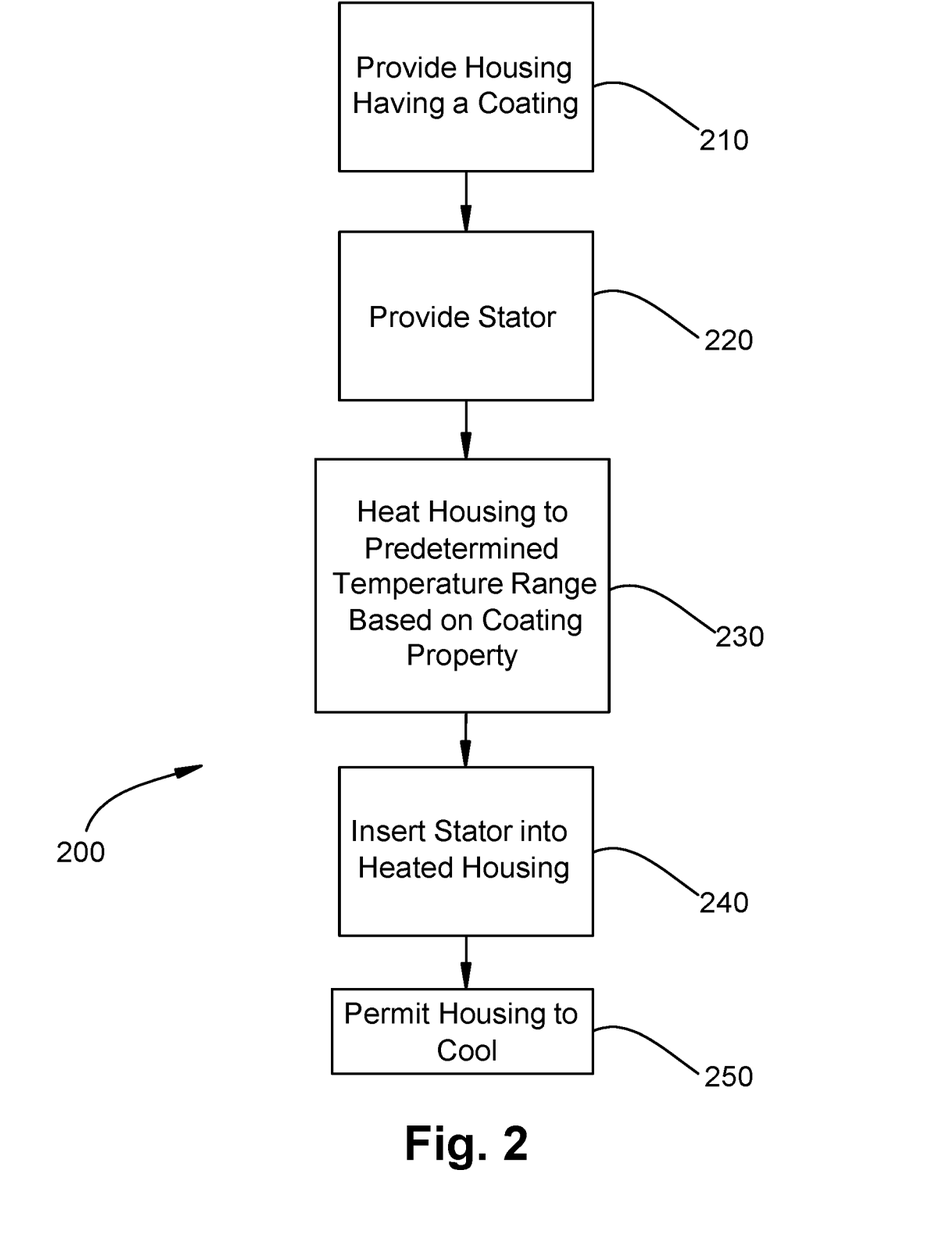
FIG. 2 is a flow diagram illustrating a method 200 of hot drop fastening of components in accordance with an example embodiment.

FIG. 2 is a flow diagram illustrating a method 200 of hot drop fastening of components in accordance with an example embodiment. With reference now to that Figure, a first machine component is provided in step 210. In the example embodiment, the first machine component 10 carries a coating 30. Further in the example embedment, the first machine component 10 may be an electric motor housing 12 carrying a coating 30 such as a primer 32 for example. It is to be appreciated that although a small amount of coating 30 is shown, the entire housing 12 may be covered in the coating. To that end, the housing 12 may be air sprayed with the coating and/or dipped into the coating. The small amount of coating is shown for ease of discussion and illustration only and is not intended to limit the embodiments herein. The first machine component 10 defines a passageway 14.

A second machine component 20 is provided in step 220. In the example embodiment, the second machine component 20 may be a stator 22, for example.

The first machine component 210 is caused to expand in step 230 by delivering a predetermined amount of energy to the first machine component, wherein the predetermined amount of energy is based on one or more properties of the coating. In a further example embodiment, the predetermined amount of energy is based on one or more properties of the coating in combination with one or more properties of the first machine component 210.

In an example embodiment, the delivering the predetermined amount of energy to the electric motor housing in step 230 comprises heating the electric motor housing 12 to a temperature that is greater than a first temperature needed to cause the passageway 14 of the electric motor housing 12 to expand to a size sufficient to receive the stator component 22 in the passageway of the electric motor housing, and less than a second temperature that would cause the one or more properties of the primer 32 to degrade.

In an example embodiment, the delivering the predetermined amount of energy to the electric motor housing in step 230 comprises heating the electric motor housing 12 to a temperature that is greater than a first temperature needed to cause the passageway 14 of the electric motor housing 12 to expand to a size sufficient to receive the stator component 22 in the passageway of the electric motor housing, and less than a second temperature that would cause the one or more properties of the primer 32 to degrade, including for example one or more of an adhesion property of the primer and/or a rust prevention property of the primer.

In a further example embodiment, the delivering the predetermined amount of energy to the electric motor housing in step 230 comprises heating the electric motor housing to a temperature of between about 215° C. and 250° C. The housing member 12 may for example have a nominal inner diameter (ID) of about 214 mm, and a nominal outer diameter (OD) of about 240 mm, for example. Further in addition, in a particular example embodiment described herein, the housing may have a nominal length of about 280 mm.

In a further example embodiment, the delivering the predetermined amount of energy to the electric motor housing in step 230 comprises heating the electric motor housing to a temperature of between about 215° C. and 250° C. in an oven.

In a further example embodiment, the delivering the predetermined amount of energy to the electric motor housing in step 230 comprises heating the electric motor housing to a temperature of between about 215° C. and 250° C., using induction heating. In an example embodiment, the heating the electric motor housing using the induction heating comprises moving a coil of an induction heating apparatus relative to the electric motor housing during the heating of the electric motor housing.

In a further example embodiment, the delivering the predetermined amount of energy to the electric motor housing in step 230 comprises heating the electric motor housing to a temperature of between about 215° C. and 250° C. using induction heating by applying power to a coil of an induction heating apparatus, based on the property of the primer, at a predetermined de-rating level for a predetermined period of time for preventing the primer to degrade including for example preventing one or more parameters of the primer to degrade such as for example preventing one or more of an adhesion property of the primer and/or a rust prevention property of the primer to degrade.

In a further example embodiment, the delivering the predetermined amount of energy to the electric motor housing in step 230 comprises heating the electric motor housing to a temperature of between about 215° C. and 250° C. using induction heating by applying power to the coil of the induction heating apparatus based on one or more of an adhesion property of the primer and/or a rust prevention property of the primer, at a predetermined de-rating level for a predetermined period of time for preventing the adhesion and/or rust prevention properties of the primer to degrade.

The second machine component 20 is inserted into the passageway of the expanded first machine component in step 240. In the example illustrated, the second machine component 20 is inserted into the passageway of the expanded first machine component substantiality along path A. The housing member 12 may have a nominal inner diameter (ID) of about 214 mm, and a nominal outer diameter (OD) of about 240 mm, for example. Further in addition, in a particular example embodiment described herein, the housing may have a nominal length of about 280 mm. Yet further in addition, in a particular example embodiment described herein, the stator member 22 may have any length as may be necessary or desired, but in the example embodiment it may have an active stator active length (the distance that engages with the housing) of about 210 mm for example.

The first machine component 10 is permitted to cool with the first machine component inserted in the passageway in step 250, thereby fastening the first machine component with the second machine component by the first machine component contracting as it cools. In an example embodiment, the first machine component 10 is permitted to cool by a natural convection process following for example Newton's law of cooling. However the cooling process may be accelerated using other processes as may be necessary and/or desired.

Using the above method, an electric motor having unique properties may be provided including in particular having properties of a primer material having been applied to a housing of the motor, the housing and the primer applied thereon having been heated to a temperature that is greater than a first temperature needed to cause the passageway 14 of the electric motor housing 12 to expand to a size sufficient to receive the stator component 22 in the passageway of the electric motor housing, and less than a second temperature that would cause the one or more properties of the primer 32 to degrade, including for example one or more of an adhesion property of the primer and/or a rust prevention property of the primer. Unexpected results are achieved with respect to the one or more properties of the coating such as for example a primer coating in a motor manufactured using a hot drop process, wherein the motor housing together with a coating such as a primer are heated to a temperature that is greater than a first temperature needed to cause the passageway of the electric motor housing to expand to a size sufficient to receive the stator component in the passageway of the electric motor housing, and less than a second temperature that would cause the one or more properties of the primer to degrade, including for example one or more of an adhesion property of the primer and/or a rust prevention property of the primer.

Along the above lines, in an embodiment, an electric motor is provided having an electric motor housing defining a passageway, a primer material on the electric motor housing, the primer material having one or more properties, and a stator component. The stator component and the electric motor housing are mutually hot drop fastened by a hot drop method including causing the electric motor housing to expand by delivering a predetermined amount of energy to the electric motor housing, wherein the predetermined amount of energy delivered to the electric motor housing is based on the one or more properties of the primer material, inserting the stator component into the passageway of the expanded electric motor housing, and permitting the electric motor housing to cool with the first stator inserted in the passageway thereby fastening the electric motor housing with the stator component by the electric motor housing contracting as it cools.

Further along the above lines, in an embodiment, an electric motor is provided wherein the stator component and the electric motor housing of the electric motor are mutually hot drop fastened by the hot drop method delivering the predetermined amount of energy to the electric motor housing by heating the electric motor housing to a temperature: greater than a first temperature needed to cause the passageway of the electric motor housing to expand to a size sufficient to receive the stator component in the passageway of the electric motor housing; and less than a second temperature that would cause the one or more properties of the primer to degrade. Example properties of the one or more properties that are not substantially degraded during the hot drop process in accordance with the example embodiments include without limitation an adhesion property of the primer and/or a rust prevention property of the primer.

In an embodiment, the housing and the primer applied thereon having been heated to a temperature that is greater than a first temperature needed to cause the passageway 14 of the electric motor housing 12 to expand to a size sufficient to receive the stator component 22 in the passageway of the electric motor housing, and less than a second temperature that would cause the one or more properties of the primer 32 to degrade, including for example one or more of an adhesion property of the primer and/or a rust prevention property of the primer.

Figure 3:
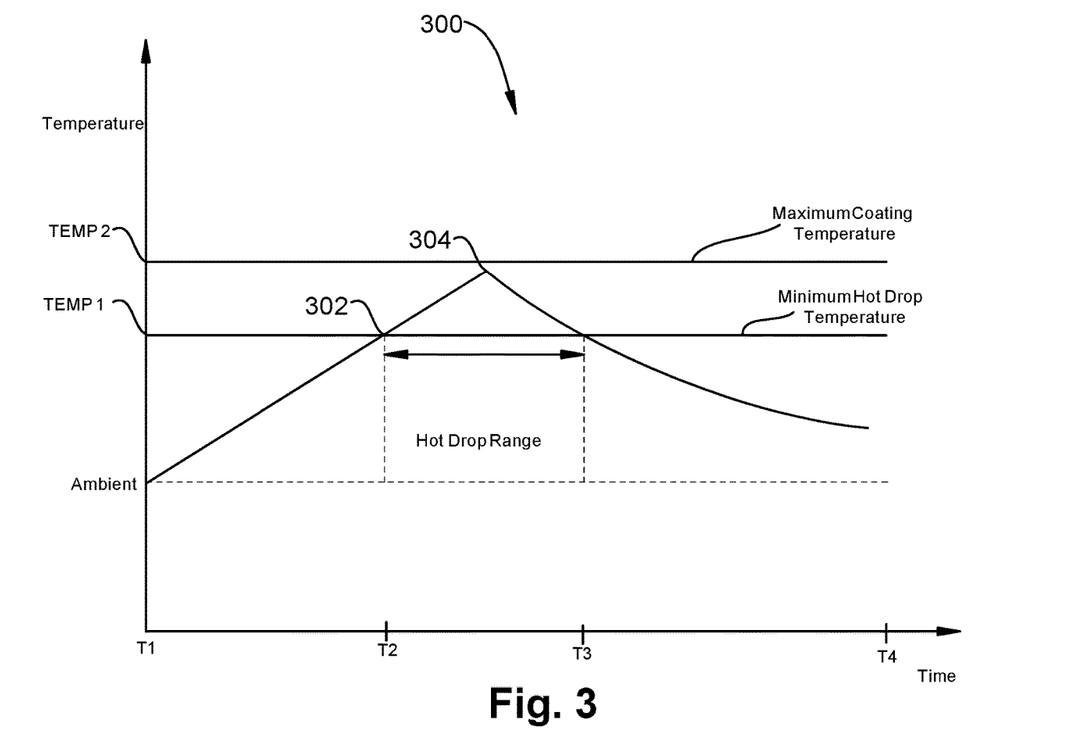
FIG. 3 shows a chart of a method of hot drop fastening of components in accordance with an example embodiment.

FIG. 3 shows a chart of a method of hot drop fastening of components in accordance with an example embodiment. With reference now to that Figure, a first machine component is provided at time T1 at an ambient temperature. In the example embodiment, the first machine component 10 carries a coating 30. Further in the example embedment, the first machine component 10 may be an electric motor housing 12 carrying a primer 32. It is to be appreciated that although a small amount of coating 30 is shown, the entire housing 12 may be covered in the coating. To that end, the housing 12 may be air sprayed with the coating and/or dipped into the coating. The small amount of coating is shown for ease of discussion and illustration only and is not intended to limit the embodiments herein. The first machine component 10 defines a passageway 14.

A second machine component 20 is also provided at time T1 at the ambient temperature. In the example embodiment, the second machine component 20 may be a stator 22, for example.

The first machine component 210 is caused to expand from time T1 to time T2 by delivering a predetermined amount of energy to the first machine component, wherein the predetermined amount of energy is based on one or more properties of the coating.

In an example embodiment, the delivering the predetermined amount of energy to the electric motor housing from time T1 to time T2 comprises heating the electric motor housing 12 to a temperature TEMP 1 that is greater than a first temperature needed to cause the passageway 14 of the electric motor housing 12 to expand to a size sufficient to receive the stator component 22 in the passageway of the electric motor housing, and less than a second temperature TEMP 2 that would cause the one or more properties of the primer 32 to degrade such as for example an adhesion property of the primer and/or a rust prevention property of the primer.

In an example embodiment an electric motor housing having a nominal inner diameter (ID) of about 214 mm, and a nominal outer diameter (OD) of about 240 mm, and a nominal length of about 280 mm may be heated by suitably adding energy to the housing with the primer thereon from time T1 to a point 302 passing through the first temperature Temp 1 at T2 for about 1.5 minutes. The electric motor housing may be further heated to a temperature between Temp 1 and Temp 2 for an additional 30 seconds to a point 304 whereat the housing with the primer thereon is sufficiently expanded to receive the stator dropped into the ID of the housing. The heating temperature profile from ambient to the point 304 may be substantially linear, for example.

In a further example embodiment, the delivering the predetermined amount of energy to the electric motor housing from time T1 to time T2 comprises heating the electric motor housing to a temperature of between about Temp 1=215° C. and TEMP 2=250° C.

In a further example embodiment, the delivering the predetermined amount of energy to the electric motor housing from time T1 to time T2 comprises heating the electric motor housing to a temperature of between about Temp 1=215° C. and TEMP 2=250° C. in an oven.

In a further example embodiment, the delivering the predetermined amount of energy to the electric motor housing from time T1 to time T2 comprises heating the electric motor housing to a temperature of between about Temp 1=215° C. and TEMP 2=250° C. using induction heating. In an example embodiment, the stator component and the electric motor housing are mutually hot drop fastened by the hot drop method heating the electric motor housing using the induction heating by moving a coil of an induction heating apparatus relative to the electric motor housing during the heating of the electric motor housing.

In a further example embodiment, the delivering the predetermined amount of energy to the electric motor housing from time T1 to time T2 comprises heating the electric motor housing to a temperature of between about Temp 1=215° C. and TEMP 2=250° C. using induction heating by applying power to a coil of an induction heating apparatus, based on the one or more properties of the primer, at a predetermined de-rating level for a predetermined period of time for preventing the one or more properties of the primer to degrade.

In a further example embodiment, the delivering the predetermined amount of energy to the electric motor housing from time T1 to time T2 comprises heating the electric motor housing to a temperature of between about Temp 1=215° C. and TEMP 2=250° C. using induction heating by applying power to the coil of the induction heating apparatus based on one or more of an adhesion property of the primer and/or a rust prevention property of the primer, at a predetermined de-rating level for a predetermined period of time for preventing the adhesion and/or rust prevention properties of the primer to degrade.

The second machine component 20 is inserted into the passageway of the expanded first machine component from time T2 to time T3. In the example illustrated, the second machine component 20 is inserted into the passageway of the expanded first machine component at time point 304 and substantiality along path A (FIG. 1).

The first machine component 10 is permitted to cool with the first machine component inserted in the passageway after stator insertion at time point 304 and including from time T3 to time T4, thereby fastening the first machine component with the second machine component by the first machine component contracting as it cools. The cooling profile from time point 304 and from time T3 to time T4 and beyond is shown in the drawing figure having a somewhat artificial slope for ease of illustration and convenience wherein it is to be appreciated that in the example embodiment, the cooling portion of the cycle is done mostly via natural convection and is therefore slower than the heating portion of the cycle wherein the cooling cycle may substantially follow Newton's law of cooling relatively well.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of hot drop fastening of components, the method comprising:

providing a first machine component defining a passageway, the first machine component carrying a coating;

providing a second machine component;

causing the first machine component to expand by delivering a predetermined amount of energy to the first machine component, wherein the predetermined amount of energy is based on one or more of an adhesion property of the coating and/or a corrosion resistance property of the coating;

inserting the second machine component into the passageway of the expanded first machine component; and permitting the first machine component to cool with the second machine component inserted in the passageway thereby fastening the first machine component with the second machine component by the first machine component contracting as it cools.

2. The method according to claim 1, wherein:

providing the first machine component carrying the coating comprises providing an electric motor housing carrying a primer material;

providing the second machine component comprises providing a stator component; and the delivering the predetermined amount of energy to the electric motor housing comprises heating the electric motor housing to a temperature:

greater than a first temperature needed to cause the passageway of the electric motor housing to expand to a size sufficient to receive the stator component in the passageway of the electric motor housing; and less than a second temperature that would cause the one or more of the adhesion and/or corrosion resistance properties of the primer to degrade.

3. The method according to claim 2, wherein:

the heating the electric motor housing comprises heating the electric motor housing to a temperature of between about 215° C. and 250° C.

4. The method according to claim 2, wherein:

the causing the electric motor housing to expand by delivering the predetermined amount of energy to the electric motor housing comprises heating the electric motor housing in an oven.

5. The method according to claim 2, wherein:

the causing the electric motor housing to expand by delivering the predetermined amount of energy to the electric motor housing comprises heating the electric motor housing using induction heating.

6. The method according to claim 5, wherein:

the heating the electric motor housing using the induction heating comprises moving a coil of an induction heating apparatus relative to the electric motor housing during the heating of the electric motor housing.

7. The method according to claim 5, wherein:

the heating the electric motor housing using the induction heating comprises applying power to a coil of an induction heating apparatus, based on the one or more of the adhesion and/or corrosion resistance properties of the primer, at a predetermined de-rating level for a predetermined period of time for preventing the one or more of the adhesion and/or corrosion resistance properties of the primer to degrade.

8. The method according to claim 7, wherein:

the applying power to the coil of the induction heating apparatus comprises, based on a rust prevention property of the primer, at a predetermined de-rating level for a predetermined period of time for preventing the rust prevention property of the primer to degrade.

9. An electric motor comprising:

an electric motor housing defining a passageway;
a primer material on the electric motor housing, the primer material having one or more properties; and
a stator component,
the stator component and the electric motor housing being mutually hot drop fastened by a hot drop method comprising:
  causing the electric motor housing to expand by delivering a predetermined amount of energy to the electric motor housing, wherein the predetermined amount of energy delivered to the electric motor housing is based on the one or more of an adhesion property of the primer material and/or a corrosion resistance property of the primer material;
  inserting the stator component into the passageway of the expanded electric motor housing; and
  permitting the electric motor housing to cool with the stator component inserted in the passageway thereby fastening the electric motor housing with the stator component by the electric motor housing contracting as it cools.

10. The electric motor to claim 9, wherein:
the stator component and the electric motor housing are mutually hot drop fastened by the hot drop method delivering the predetermined amount of energy to the electric motor housing by:
  heating the electric motor housing to a temperature:
    greater than a first temperature needed to cause the passageway of the electric motor housing to expand to a size sufficient to receive the stator component in the passageway of the electric motor housing; and
    less than a second temperature that would cause the one or more of the adhesion and/or corrosion resistance properties of the primer material to degrade.

11. The electric motor according to claim 10, wherein:
the stator component and the electric motor housing are mutually hot drop fastened by the hot drop method heating the electric motor housing by:
  heating the electric motor housing to a temperature of between about 215° C. and 250° C.

12. The electric motor according to claim 10, wherein:
the stator component and the electric motor housing are mutually hot drop fastened by the hot drop method causing the electric motor housing to expand by:
  delivering the predetermined amount of energy to the electric motor housing by heating the electric motor housing in an oven.

13. The electric motor according to claim 10, wherein:
the stator component and the electric motor housing are mutually hot drop fastened by the hot drop method causing the electric motor housing to expand by:
  delivering the predetermined amount of energy to the electric motor housing by heating the electric motor housing using induction heating.

14. The electric motor according to claim 13, wherein:
the stator component and the electric motor housing are mutually hot drop fastened by the hot drop method heating the electric motor housing using the induction heating by:
  moving a coil of an induction heating apparatus relative to the electric motor housing during the heating of the electric motor housing.

15. The electric motor according to claim 13, wherein:
the stator component and the electric motor housing are mutually hot drop fastened by the hot drop method heating the electric motor housing using the induction heating by:
  applying power to a coil of an induction heating apparatus, based on the one or more of the adhesion and/or corrosion resistance properties of the primer, at a predetermined de-rating level for a predetermined period of time for preventing the one or more of the adhesion and/or corrosion resistance properties of the primer to degrade.

16. The electric motor according to claim 15, wherein:
the stator component and the electric motor housing are mutually hot drop fastened by the hot drop method heating the electric motor housing using the induction heating applying the power to the coil of the induction heating apparatus by:
  applying the power to the coil of the induction heating apparatus based on a rust prevention property of the primer, at a predetermined de-rating level for a predetermined period of time for preventing the rust prevention property of the primer to degrade.

17. A product comprising:
a first machine component defining a passageway;
a material on the first machine component, the material having one or more of an adhesion and/or a corrosion resistance property; and
a second machine component,
the second machine component and the first machine component being mutually hot drop fastened by a hot drop method comprising:
  causing the first machine component to expand by delivering a predetermined amount of energy to the first machine component, wherein the predetermined amount of energy delivered to the first machine component is based on the one or more of the adhesion and/or corrosion resistance properties of the material;
  inserting the second machine component into the passageway of the expanded first machine component; and
  permitting the first machine component to cool with the second machine component inserted in the passageway thereby fastening the first machine component with the second machine component by the first machine component contracting as it cools.

18. The product to claim 17, wherein:
the second machine component and the first machine component are mutually hot drop fastened by the hot drop method delivering the predetermined amount of energy to the first machine component by:
  heating the first machine component to a temperature:
    greater than a first temperature needed to cause the passageway of the first machine component to expand to a size sufficient to receive the second machine component in the passageway of the first machine component; and
    less than a second temperature that would cause the one or more of the adhesion and/or corrosion resistance properties of the material to degrade.

19. The product according to claim 18, wherein:
the second machine component and the first machine component are mutually hot drop fastened by the hot drop method heating the first machine component by:
  heating the first machine component to a temperature of between about 215° C. and 250° C.

20. The product according to claim 19, wherein:
the second machine component and the first machine component are mutually hot drop fastened by the hot drop method causing the first machine component to expand by one or more of:
  delivering the predetermined amount of energy to the first machine component by heating the first machine component in an oven; and/or
  delivering the predetermined amount of energy to the first machine component by heating the first machine component using induction heating.

\* \* \* \* \*